(12) United States Patent
Pollet

(10) Patent No.: US 11,089,341 B2
(45) Date of Patent: Aug. 10, 2021

(54) SYSTEM AND METHOD FOR CAPTURING AND DISTRIBUTING A LIVE AUDIO STREAM OF A LIVE EVENT IN REAL-TIME

(71) Applicant: Prowire Sport LLC, Wilmington, DE (US)

(72) Inventor: Michel Pollet, Burnham (GB)

(73) Assignee: Prowire Sport LLC, Wilmington, DE (US)

( * ) Notice: Subject to any disclaimer, the term of this patent is extended or adjusted under 35 U.S.C. 154(b) by 0 days.

(21) Appl. No.: 15/977,269

(22) Filed: May 11, 2018

(65) Prior Publication Data
US 2019/0349608 A1 Nov. 14, 2019
US 2021/0067812 A2 Mar. 4, 2021

(51) Int. Cl.
*H04N 21/2187* (2011.01)
*H04N 21/414* (2011.01)
(Continued)

(52) U.S. Cl.
CPC ....... *H04N 21/2187* (2013.01); *H04N 21/233* (2013.01); *H04N 21/41407* (2013.01); *H04L 29/06027* (2013.01)

(58) Field of Classification Search
CPC ............. H04N 21/2187; H04N 21/233; H04N 21/41407; H04N 21/2401;
(Continued)

(56) References Cited

U.S. PATENT DOCUMENTS 5,719,786 A 2/1998 Nelson et al.
5,844,600 A 12/1998 Kerr
(Continued)

FOREIGN PATENT DOCUMENTS

| KR | 101129885 | * | 3/2012 | ............ H04L 12/64 |
| KR | 101129885 B1 | * | 3/2012 | ....... H04L 29/06027 |

(Continued)

OTHER PUBLICATIONS

PCT Patent Application No. PCT/US2019/040049, International Search Report and Written Opinion, dated Sep. 20, 2019, 11 pages.
(Continued)

*Primary Examiner* — Patrice L Winder
*Assistant Examiner* — Aye M Aung
(74) *Attorney, Agent, or Firm* — Kilpatrick Townsend & Stockton LLP

(57) ABSTRACT

Systems and methods for capturing and distributing a live audio stream of a live event in real-time to a plurality of mobile computing devices are described. The system comprises at least one memory configured to store computer-executable instructions and processing device(s) coupled to the at least one memory and at least one audio input device configured to receive the live audio stream. Upon receipt of the live audio stream, the processing device(s) generate, in real-time, a plurality of discrete audio data packets from the live audio stream, and transmit that respective discrete audio data packet over a first network for receipt by the mobile computing devices. In respect of each one of the discrete audio data packets, a copy of the discrete audio data packet is transmitted for receipt by each one of the mobile computing devices prior to transmitting another one of the discrete audio data packets.

15 Claims, 7 Drawing Sheets

(51) Int. Cl.
*H04N 21/233* (2011.01)
*H04L 29/06* (2006.01)

(58) Field of Classification Search
CPC ........... H04L 29/06027; H04L 65/4084; H04L 65/602; H04L 65/608; H04L 65/80
See application file for complete search history.

(56) References Cited

U.S. PATENT DOCUMENTS

| | | | |
|---|---|---|---|
| 6,195,680 | B1 | 2/2001 | Goldszmidt et al. |
| 7,154,898 | B1 | 12/2006 | Pecus et al. |
| 7,313,593 | B1 | 12/2007 | Pulito et al. |
| 7,830,787 | B1* | 11/2010 | Wijnands ............... H04L 47/122 370/218 |
| 8,085,784 | B2* | 12/2011 | Komagata ............... H04L 47/50 370/395.4 |
| 8,370,888 | B2 | 2/2013 | Zimmermann et al. |
| 8,681,768 | B2 | 3/2014 | Coete et al. |
| 8,861,520 | B1* | 10/2014 | Signaoff ............ H04L 67/1095 370/390 |
| 8,880,632 | B1 | 11/2014 | Michels |
| 9,148,257 | B2* | 9/2015 | Ilan ....................... H04L 1/0084 |
| 2001/0027491 | A1 | 10/2001 | Terretta et al. |
| 2004/0170159 | A1 | 9/2004 | Kim et al. |
| 2004/0225728 | A1 | 11/2004 | Huggins et al. |
| 2005/0183120 | A1* | 8/2005 | Jain .................... H04N 21/2225 725/46 |
| 2006/0222323 | A1 | 10/2006 | Sharpe et al. |
| 2007/0201454 | A1* | 8/2007 | Weir ................. H04M 3/42221 370/356 |
| 2008/0130616 | A1 | 6/2008 | Wengerter et al. |
| 2009/0077254 | A1 | 3/2009 | Darcie et al. |
| 2010/0074255 | A1* | 3/2010 | Harpaz ................. H04L 1/1874 370/390 |
| 2011/0153862 | A1* | 6/2011 | Roosta ................ H04L 63/1441 709/234 |
| 2011/0228769 | A1* | 9/2011 | Haimi-Cohen ......... H04L 12/18 370/390 |
| 2012/0151075 | A1 | 6/2012 | Mraz et al. |
| 2012/0259994 | A1* | 10/2012 | Gillies ................ H04L 65/4076 709/231 |
| 2013/0024582 | A1 | 1/2013 | Rodrigues |
| 2013/0067523 | A1 | 3/2013 | Kamitakahara et al. |
| 2014/0280642 | A1 | 9/2014 | van Oldenborgh et al. |
| 2014/0369249 | A1* | 12/2014 | Mikhailov ............... H04W 4/06 370/312 |
| 2015/0058120 | A1 | 2/2015 | Guo et al. |
| 2015/0071458 | A1 | 3/2015 | Sullivan |
| 2015/0150065 | A1 | 5/2015 | Shankar et al. |
| 2015/0256580 | A1* | 9/2015 | Morton ................... H04L 29/06 709/219 |
| 2016/0036693 | A1* | 2/2016 | Galdy ................... H04L 69/164 709/219 |
| 2016/0373819 | A1 | 12/2016 | Ramakrishnan et al. |
| 2016/0381101 | A1 | 12/2016 | Tse |
| 2017/0118263 | A1 | 4/2017 | Crabtree et al. |
| 2017/0123991 | A1* | 5/2017 | Sela ....................... G11C 16/102 |
| 2017/0163567 | A1 | 6/2017 | Roitshtein et al. |
| 2017/0201571 | A1 | 7/2017 | Sherf et al. |
| 2017/0272375 | A1 | 9/2017 | Muesch et al. |
| 2017/0339203 | A1 | 11/2017 | Kekre et al. |
| 2018/0032967 | A1 | 2/2018 | Barker et al. |
| 2018/0234361 | A1 | 8/2018 | Bergman |
| 2018/0324073 | A1* | 11/2018 | Kai ..................... H04L 43/0888 |
| 2019/0075430 | A1* | 3/2019 | Lincoln ................. H04W 24/10 |

FOREIGN PATENT DOCUMENTS

| | | |
|---|---|---|
| WO | 2018213171 | 11/2018 |
| WO | 2018213173 | 11/2018 |

OTHER PUBLICATIONS

U.S. Appl. No. 16/027,508, Non-Final Office Action, dated Mar. 23, 2021, 25 pages.
U.S. Appl. No. 16/027,508, Advisory Action, dated Nov. 18, 2020, 3 pages.
U.S. Appl. No. 16/027,508, Final Office Action, dated Sep. 4, 2020, 25 pages.
PCT Patent Application No. PCT/US2019/031493, International Search Report and Written Opinion, dated Jul. 23, 2019, 11 pages.
Bui et al., "Soft Real-Time Chains for Multi-Hop Wireless Ad-Hoc Networks", Real Time and Embedded Technology and Applications Symposium, 2007, RTAS '07, 13$^{th}$ IEEE, IEEE, 10 pages.
U.S. Appl. No. 16/027,508, "Non-Final Office Action," dated Dec. 30, 2019, 25 pages.

* cited by examiner

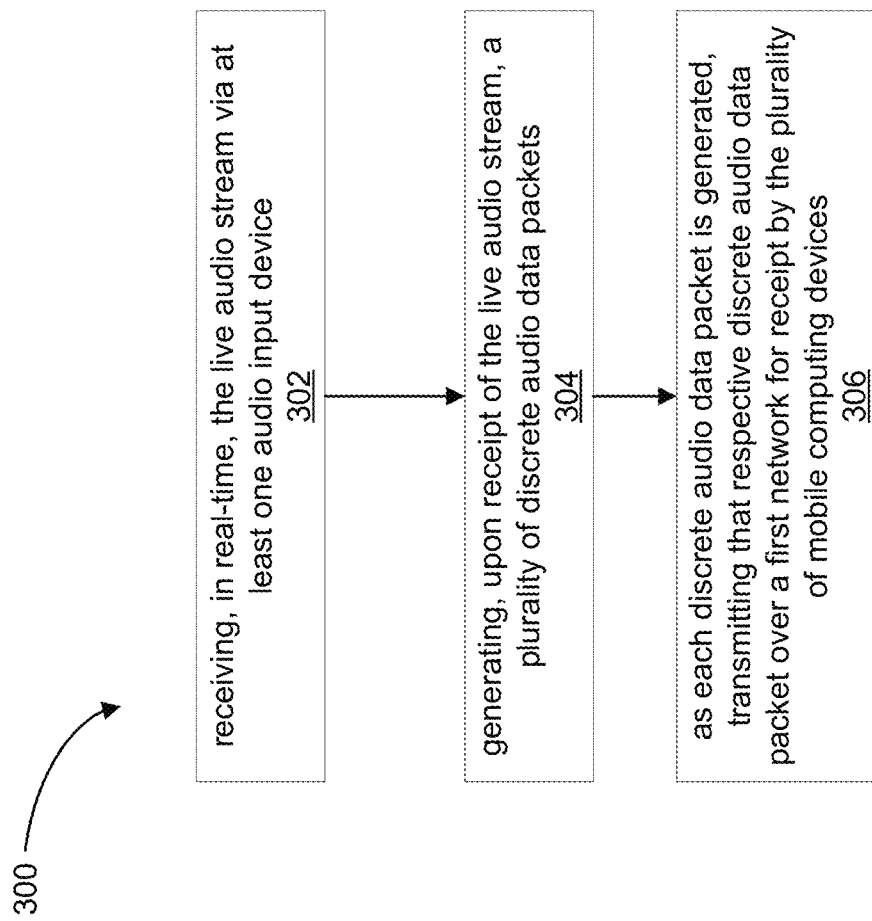

SYSTEM AND METHOD FOR CAPTURING AND DISTRIBUTING A LIVE AUDIO STREAM OF A LIVE EVENT IN REAL-TIME

FIELD

The specification relates generally to the transmission of a live audio stream, and specifically to systems and methods for capturing and distributing a live audio stream of a live event in real-time to a plurality of mobile computing devices.

BACKGROUND

Audio streaming is commonly used by radio stations and music streaming services to distribute audio material over the internet. These services are optimized to provide good quality audio while latency is deemed to be less important. Even "live" radio programs that are streamed over the internet typically have several seconds of latency from source to end listener.

The internet is a vast network of networks, owned by many different entities including government, private companies and academic institutions. Network segments vary in speed and capacity, and data packets may take a multitude of different routes through those networks dependent upon the type of data in the packet and network conditions at that instant in time.

As such the routing of data between the server and client device (or devices) is not fixed, and may vary from one packet to the next. Packets can arrive with irregular timing and may arrive out of order.

In order to preserve the original audio quality in the face of these changing network conditions, the audio client device(s) will typically utilize large data buffers in order to reassemble the incoming packets into the correct order and remove timing jitter. Such mechanisms usually result in significant latency or delay between the time the audio data is received at the server (or associated audio input device(s)) and the time the audio data is received at the audio client device from the server.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 7 depicts an example method for capturing and distributing a live audio stream of a live event in real-time to a plurality of mobile computing devices, according to non-limiting embodiments.

DETAILED DESCRIPTION

Figure 1:
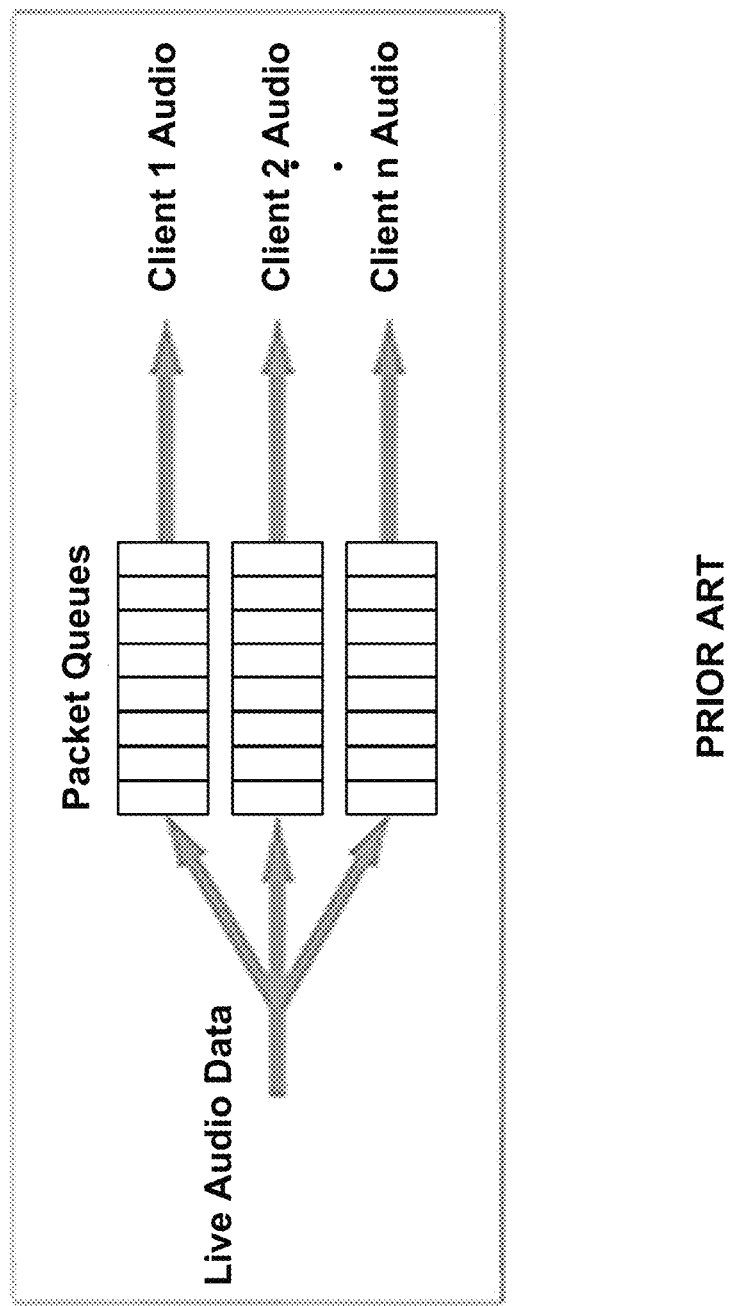
FIG. 1 depicts a schematic diagram of certain aspects of known audio data streaming systems and methods.

Herein described are systems and methods for capturing and distributing a live audio stream of a live event in real-time to a plurality of mobile computing devices. It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, method blocks, components, parts of components, and the like described herein in the singular are to be interpreted as also including a description of such systems, method steps, components, parts of components, and the like in the plural, and vice versa.

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

In the present application, components may be described as being "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

Generally, the described systems and methods are suitable for use at live events, such as sporting events, in large venues, such as sports stadia or convention centres. One or more computing devices, such as servers, are used to stream live audio to the audience members at the venue via their respective mobile computing devices. Audience members can receive the audio stream on their own mobile phone or another mobile computing device. According to some embodiments, the audio stream is used in venue only, does not leave the local area network (LAN) of the venue and does not cross the Internet.

The audio that is streamed typically relates directly to the live event in progress in the venue. For example, according to some embodiments, live audio is captured from an athlete or referee (via at least one audio input device, such as a microphone worn by the athlete or referee) as they participate in a sports match. The audience member can listen via the mobile computing device to what is being said on the field of play as they watch the action.

Latency or delay is a particularly important consideration in distributing a live audio stream of a live event in a venue. The audio stream relates to live action happening in view of the audience, so it is particularly important to the listening audience member that the audio and live action appear to be synchronized. If there is too much delay between what the audience sees and what they hear then the effect will tend to be distracting and may ruin the experience. Persons skilled in the art will appreciate that end-to-end latencies up to and including 500 milliseconds (mS) are generally considered "real-time". However, the amount of delay that can be tolerated depends upon what the audience members can see and hear. For example, if the audience can see a player's or a commentator's lips moving while they are talking then generally an audio delay, or end-to-end latency, of more than 45 mS is usually problematic. If the audience members are further away, so that they cannot see the lips moving, then a delay, or end-to-end latency, of 100 to 500 mS may be an acceptable user experience.

To minimize the end-to-end latency between the audio source and the mobile computing device clients, while supporting a large number of mobile computing device clients, the described systems and methods tends to optimize the audio path through the distributing computing devices for low latency, low Central Processing Unit (CPU) load and low memory footprint.

In addition, some major sports venues can accommodate up to 100,000, or more, spectators, and so embodiments of the system must also support a very large number of mobile client devices. According to some embodiments of the systems and methods described herein, the load can be spread over multiple servers, such that each server is capable of supporting thousands of concurrent users.

Figure 2:
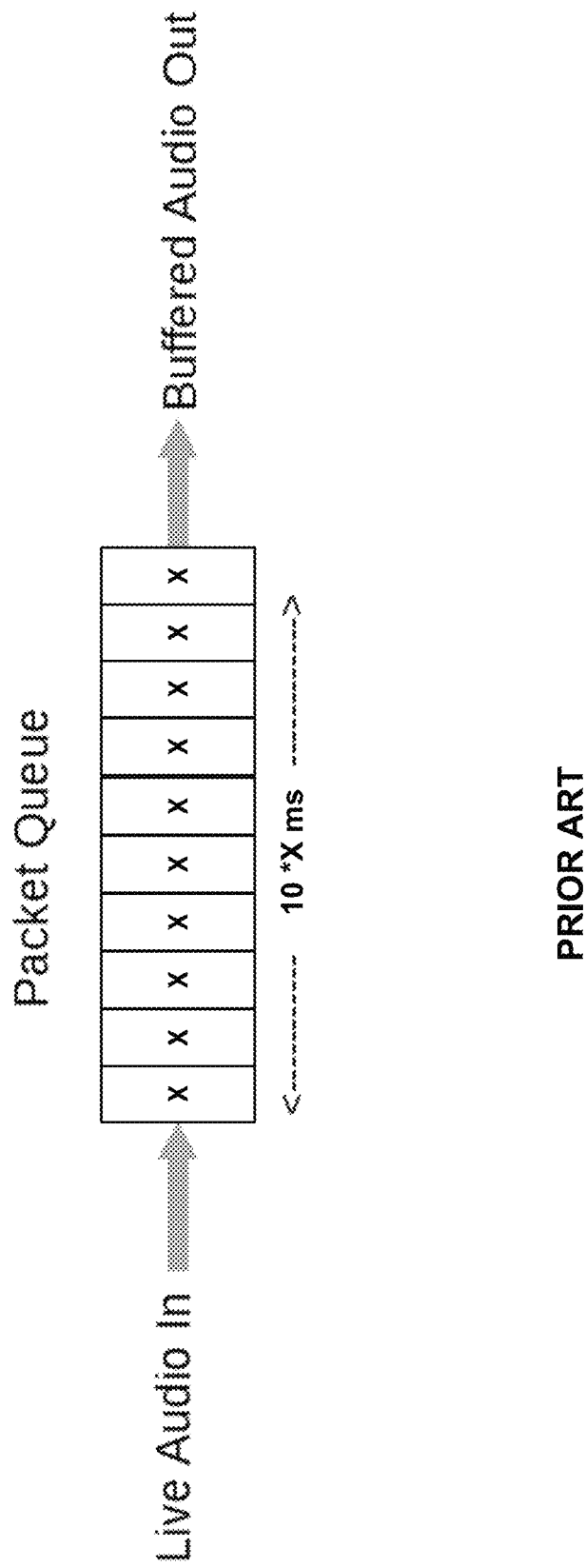
FIG. 2 depicts a schematic diagram of certain aspects of known audio data streaming systems and methods.

Attention is directed to FIGS. 1 and 2, which are schematic diagrams depicting how audio data is processed in a typical audio streaming system. As shown in FIGS. 1 and 2, the typical server creates an output data queue for each attached client device. This allows the end client device to pause and or seek within the audio stream without affecting any other client device of the system. For example, if one client device pauses the audio stream, it should not pause for all other connected client devices.

Such data packet queues require a significant amount of memory to implement, and each requires CPU time to manage. The CPU and memory requirement limit the number of concurrent client devices that can be supported by a single server. They also add latency to the audio stream, since each data packet stored on the queue adds another packet time to the end-to-end delay. In the example shown in FIG. 2, 10 packets of X mS each are queued, producing 10*X mS of latency between the time the live audio data is captured at a connected audio device and is transmitted to the client devices (such as to Client 1 Audio, Client 2 Audio to Client n Audio in FIG. 1). As illustrated in FIG. 2, the latency increases as the packet queues increase. In contrast, the described systems capture and distribute a live audio stream in real-time and so there is little or no provision for pausing or seeking within the audio stream.

Figure 3:
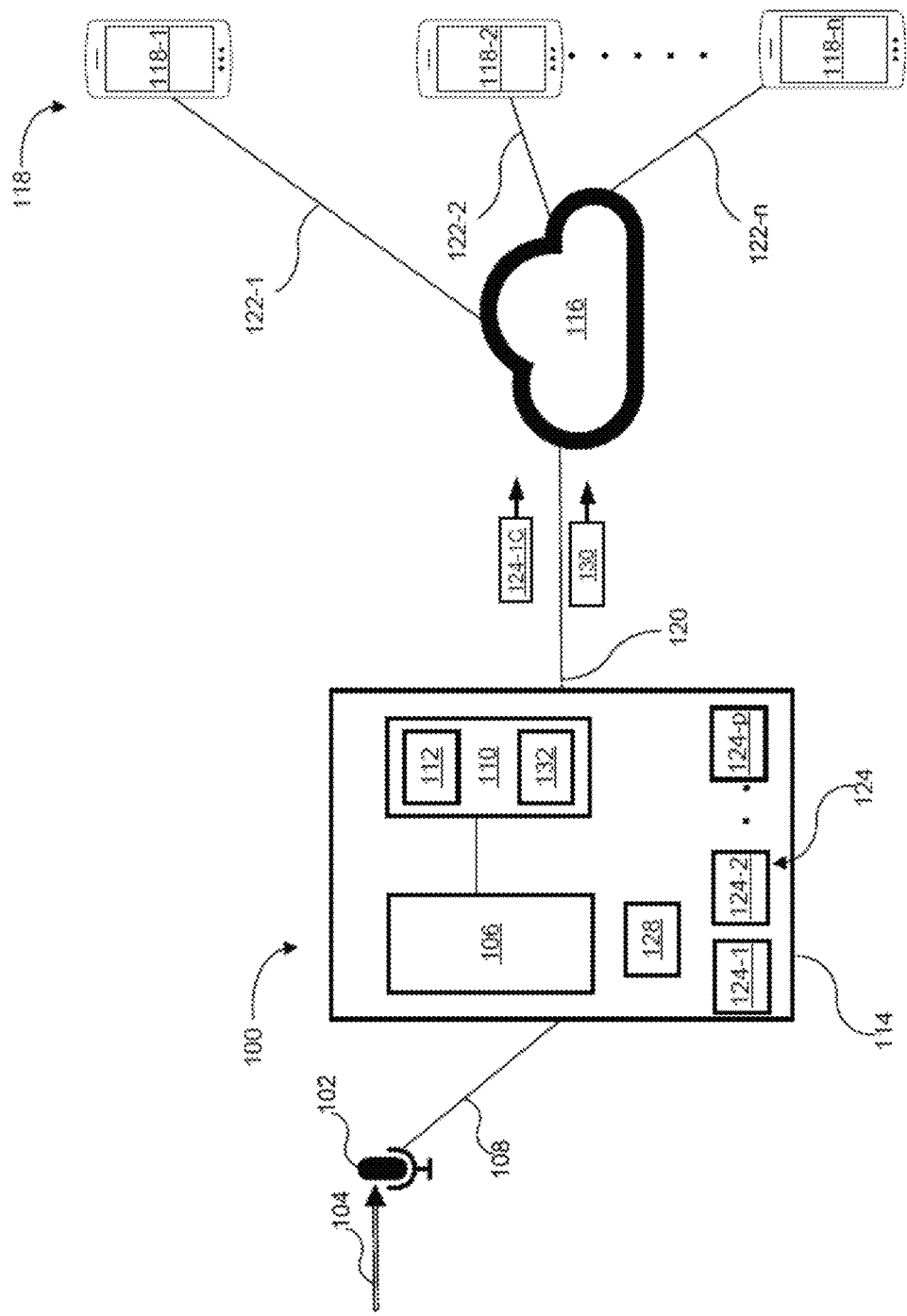
FIG. 3 depicts an example system for capturing and distributing a live audio stream of a live event in real-time to a plurality of mobile computing devices, according to non-limiting embodiments.

Attention is directed to FIG. 3, which depicts an example system 100 for capturing and distributing a live audio stream of a live event in real-time to a plurality of mobile computing devices. System 100 comprises at least one processing device 106 coupled to at least one audio input device, such as audio input device 102. Although one audio input device is depicted, according to some embodiments, system 100 comprises a plurality of audio input devices. Audio input device 102 is any suitable audio input device, such as a wired or wireless microphone worn by a referee of the live event. Audio input device 102 (or audio input devices 102) receives, in real-time, a live audio stream 104 from the live event. The live audio stream 104 comprises a live audio signal that conveys, for example, a referee's voice. Although the systems and methods described herein describe the capturing and distribution of a live audio stream, it is understood that the systems and methods may also be utilized to capture a live multimedia stream that comprises audio data and video data or a live video stream that comprises video data (without audio data).

As noted above, the audio device 102 is coupled to processing device 106. For example, the processing device 106 may be configured to communicate with the audio device 102 over communication link 108 such that the processing device 106 is enabled to receive live audio stream 104 from the audio device 102. Communication link 108 comprises any suitable wired and/or wireless communication link(s), or suitable combination thereof. The processing device 106 may also be configured to communicate with the audio device 102 in accordance with any suitable protocol or protocols, such as wireless data protocols, WiFi protocols, WiMax protocols, and/or a combination. As used herein, the terms "processing device", "processing devices", "processing device(s)", "processor", "processors" or "processor(s)" may refer to any combination of processing devices, and the like, suitable for carrying out the actions or methods described herein. For example, processing device 106 may comprise any suitable processing device, or combination of processing devices, including but not limited to a microprocessor, a central processing unit (CPU) and the like. Other suitable processing devices are also within the scope of the application.

Processing device 106 is coupled to memory 110. Memory 110 can comprise any suitable memory device, including but not limited to any suitable one of, or combination of, a local and/or remote volatile memory, non-volatile memory, random access memory (RAM), read-only memory (ROM), hard drive, optical drive, buffer(s), cache(s), flash memory, magnetic computer storage devices (e.g. hard disks, floppy disks, and magnetic tape), optical memory ((e.g., CD(s) and DVD(s)), and the like. Other suitable memory devices are also within the scope of the application. As such, it is understood that the term "memory", or any variation thereof, as used herein may comprise a tangible and non-transitory computer-readable medium (i.e., a medium which does not comprise only a transitory propagating signal per se) comprising or storing computer-executable instructions, such as computer programs, sets of instructions, code, software, and/or data for execution of any method(s), step(s) or process(es) described herein by any processing device(s) and/or microcontroller(s) described herein. Memory 110 is configured to store computer-executable instructions 112 for execution by at least one processing device, including processing device 106.

In FIG. 3, processing device 106 and memory 110 are depicted as co-located on computing device 114. Computing device 114 may comprise one or more computing devices, such as one or more servers, desktop computers and mobile computing devices. According to some embodiments, processing device 106 and memory 110 are not located on the same computing device. For example, according to some embodiments, example system 100 comprises two or more servers in wired and/or wireless communication with each other, and the processing device 106 is located on one of the servers while memory 110 is located on another one of the two or more computing devices.

The processing device 106 is configured to transmit data over first network 116 for receipt by a plurality of mobile computing devices 118-1 to 118-$n$ (referred to collectively as the plurality of mobile computing devices 118 or mobile computing devices 118). For example, the processing device 106 may be in communication with the mobile computing devices 118 to transmit data over the first network 116 via communication links 120 and 122-1 to 122-*n* (communications links 122-1 to 122-*n* referred to collectively as communication links 122). The communication links 120 and 122 comprise any suitable wired and/or wireless communication link(s), or suitable combination thereof. The processing device 106 may also be configured to transmit and receive data over the first network 116 according to any suitable protocol or protocols, such as wireless data protocols, cellular device protocols, WiFi protocols, WiMax protocols, Real-Time Transport Protocol (RTP) and/or a combination of protocols. According to some embodiments, first network 116 is a LAN of the venue hosting the live event. According to some embodiments, the first network 116 is a wireless network.

The mobile computing devices 118 are any computing devices suitable for communicating with the processing device 106 over the first network 116 and for outputting received audio data to users of the mobile computing devices 118. For example, mobile computing devices 118 may be one or more tablet computing devices, laptop computing devices, PDAs (personal digital assistants), cellphones, smartphones, computer terminals having at least one suitable audio output device. In addition, the mobile computing devices 118 are configured to subscribe to the live audio stream 104. For example, according to some embodiments, the processing device 106 is in communication with a Real-Time Streaming Protocol (RTSP) media manager 128. The RTSP media manager 128 accepts incoming session requests from the mobile computing devices 118 (requests to access to the live audio stream 104 via the processing device 106) using the RTSP to commence or stop access to the live audio stream 104 for any of the mobile computing devices 118.

In accordance with the computer-executable instructions 112, the processing device 106 is enabled to receive the live audio stream 104 from the audio input device 102 (or audio input devices 102) in real-time. The received live audio stream 104 may be in analog and/or digital format. According to some embodiments, if the received live audio stream 104 is in analog format (i.e., an analog signal), then the processing device 106, in accordance with the computer-executable instructions 112, is enabled to convert the received live audio stream 104 into a digital format. According to some embodiments, the processing device 106 is configured to compress the live audio stream 104 using a suitable low latency audio codec, such as G.711, MP3 or Opus.

Upon receipt of the live audio stream 104 at the audio input device(s) 102, the processing device 106 is enabled to, in real-time, generate a plurality of discrete audio data packets 124-1 to 124-*p* (also referred to collectively as discrete audio data packets 124) from the live audio stream 108.

As each discrete audio data packet is generated, the processing device 106 is enabled to transmit that respective discrete audio data packet, such as discrete audio data packet 124-1, over a first network 116 for receipt by mobile computing devices 118. For each one of the discrete audio data packets 124, transmitting that respective discrete audio data packet comprises the processing device 106 generating and transmitting a copy that discrete audio data packet, such as copy 124-1C of the discrete audio data packet 124-1, for receipt by the mobile computing devices 118. The processing device 106 transmits the copy of that discrete audio data packet before transmitting another one of the discrete audio data packets 124, such as discrete audio data packet 124-2, to the mobile computing devices 118. For example, the processing device 106 transmits copy 124-1C before transmitting a copy of discrete audio data packet 124-2 and so on.

The transmission of the discrete audio data packets 124 to a respective one of the mobile computing devices, such as mobile computing device 118-1, is continuous. According to some embodiments, the transmission continues until that respective mobile computing device 118-1 sends a request to the processing device 106, via the RTSP transmission manager 128, to stop the transmission of the discrete audio data packets 124. According to some embodiments, the processing device 106, via the RTSP media manager 128, detects that the respective mobile computing device 118-1 is no longer responding to data requests from the processing device 106 or is no longer connected to the first network 116. For example, according to some embodiments, the processing device 106 and the respective mobile computing device 118-1 may periodically transmit Real-Time Control Protocol (RTCP) signaling data 130 for the purpose of continuing the transmission of the discrete audio data packets 124 to the respective mobile computing device 118-1 until the respective mobile computing device 118-1 has ceased communication with the processing device 106.

According to some embodiments, a list 132 of subscribing mobile computing devices is maintained at memory 110 or another storage medium accessible by the processing device 106. According to some embodiments, the list 132 is updated periodically. According to some embodiments, the list 132 is continuously updated.

According to some embodiments, the processing device 106 is enabled to transmit the discrete audio data packets 124 over the first network 116 to the mobile computing devices 118 by Unicast transmission. According to some embodiments, the processing device 106 is enabled to transmit the discrete audio data packets 124 over the first network 116 to the mobile computing devices 118 in accordance with the User Datagram Protocol (UDP).

As discussed above, the systems and methods described herein can minimize end-to-end latency between the audio source and the mobile computing device clients. According to some embodiments, system latency time, the time from which the live audio stream 104 is received at the at least one audio input device to the time each one of the discrete audio data packets generated from the live audio stream 104 are transmitted to the mobile computing devices 118, is less than 500 mS. According to some embodiments, the system latency time is in the range of about 100 mS to about 500 mS. According to some embodiments, the system latency time is in the range of near-zero mS to about 100 mS. According to some embodiments, the system latency time is in the range of near-zero mS to about 25 mS. For example, according to some embodiments, the system latency time is in the range of about 0.1 mS to about 100 mS or about 0.1 mS to about 25 mS or about 0.1 mS to about 500 mS.

As discussed above in respect of FIGS. 1 and 2, the typical server creates an output data queue for each attached client device. This output queue usually contains several data packets, which require a significant amount of memory to implement, require CPU time to manage, limit the number of concurrent client devices that can be supported by a single server and add latency to the audio stream.

Figure 4:
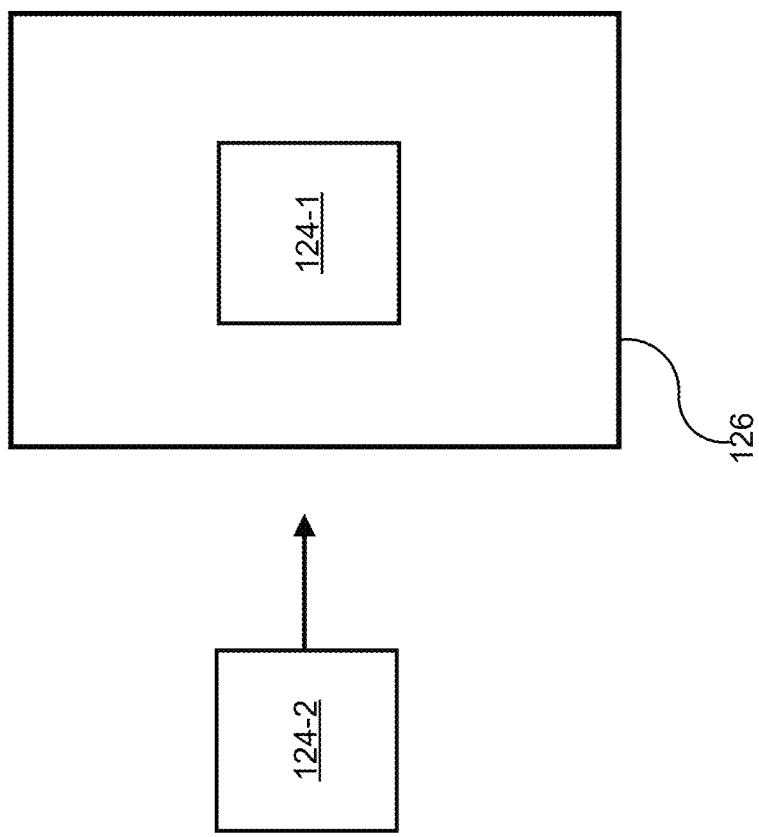
FIG. 4 depicts an example buffer holding a discrete audio data packet generated from a live audio stream, according to non-limiting embodiments.

According to some embodiments, prior to transmitting the copy of a respective discrete audio data packet, such as copy 124-1C, the processing device 106 is further enabled to place the respective discrete audio data packet in a buffer 126 (see FIG. 4). According to some embodiments, the buffer 126 is configured to store a single one of the discrete audio data packets 124. The processing device 106 generates copies of the respective discrete audio data packet placed in the buffer 126 for each one of the mobile computing devices 118. For example, the processing device 106 may generate copies 124-1C for each one of the mobile computing devices 118 that have subscribed to the live audio stream 104. According to some embodiments, in transmitting a respective one of the discrete audio data packets 124 to the mobile computing devices 118, the processing device 106 retrieves the generated copies of the respective one of the discrete audio data packets, such as copies 124-1C, from the buffer 126 and transmits the copies over first network 116 for receipt by mobile computing devices 118.

Figure 5:
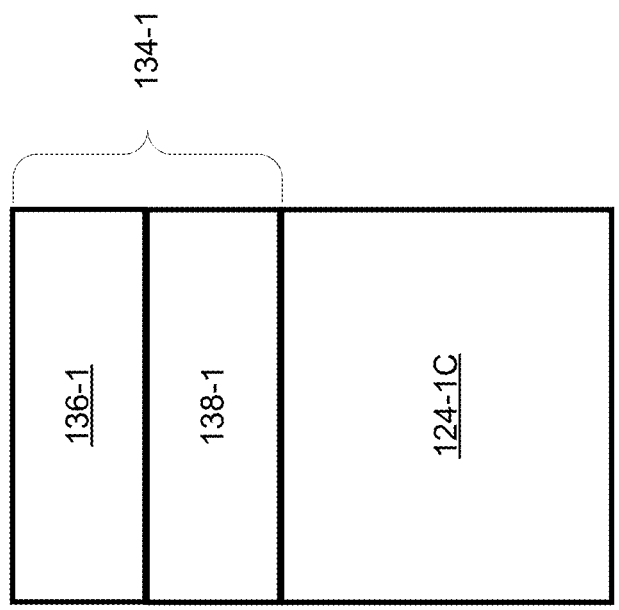
FIG. 5 depicts an example copy of a discrete audio data packet generated from a live audio stream, according to non-limiting implementations.

Attention is directed to FIG. 5, which shows a copy 124-1C of the discrete audio data packet 124-1, according to some embodiments. As discussed above, a list 132 of subscribing mobile computing devices may be maintained by system 100. According to some embodiments, the list 132 also includes a unique Internet Protocol (IP) address, various statistics and control information for each of the subscribing mobile computing devices, such as mobile computing devices 118. Some examples of the control information include a timestamp, a packet sequence number (which may be used by a mobile computing device client to detect packet loss or restore the packet sequence), a payload type (such as G.711/Opus) and a source identifier.

As discussed above, the processing device 106 generates copies of each discrete audio data packet for the mobile computing devices, such as copies 124-1C for mobile devices 118-1 to 118-n. According to some embodiments, for each copy of the discrete audio data packet, the processing device 106 generates a header comprising a packet sequence number associated with that copy of the discrete audio data packet and a unique identifier associated with the respective one of the mobile computing devices to which that copy of the discrete audio data packet is to be transmitted for receipt by the processing device 106. According to some embodiments, the packet sequence identifier number is included as part of control information about the respective mobile computing device. Prior to transmission of the copy of the discrete audio data packet, the header is added to that copy. In transmitting the copy of the discrete audio data packet for receipt by the respective mobile computing device, the processing device transmits both the copy of the discrete audio data packet with the header over the first network 116 for receipt by the respective mobile computing device.

For example, if copy 124-1C is to be transmitted for receipt by mobile computing device 118-1, processing device generates header 134-1 for copy 124-1C. The header 134-1 includes control information 136-1 and a unique identifier 138-1, such as a unique IP address, specifically associated with mobile computing device 118-1. The control information 136-1 may include a packet sequence identifier number identifying a position in the received live audio stream 104 associated with the discrete audio data packet 124-1. The control information 136-1 may also include other information about discrete audio data packet 124-1, such as data type.

As discussed above, according to some embodiments, prior to transmitting the copy of a respective discrete audio data packet, such as copy 124-1C, the processing device 106 is further enabled to place the respective discrete audio data packet, such as discrete audio data packet 124-1, in the buffer 126, and the copies of the discrete audio data packet 124-1C are generated based on the discrete audio data packet in the buffer 126. According to some embodiments, as each discrete audio data packet arrives in the buffer 126, the processing device 106 identifies a first one of the mobile computing devices 118 to which a copy of that discrete audio data packet is to be transmitted, based on the list 132. The processing device 106 generates a copy of that discrete audio data packet, such as copy 124-1C, and a header associated with that first mobile computing device, such as header 134-1 associated with mobile computing device 118-1. The processing device 106 transmits the copy of the discrete audio data packet with the associated header to the first mobile computing device. The processing device 106 then identifies a second one of the mobile computing devices, such as mobile computing device 118-2, and repeats the process of generating a copy of the discrete audio data packet and a new header, now associated with the second mobile computing device, and transmitting the copy of the discrete audio data packet with the header for receipt by the second mobile computing device.

The processing device 106, cycling through the list 132, continues to generate and transmit copies of the discrete audio data packet and associated headers to the remaining mobile computing devices using the same buffer. In other words, rather than generating a buffer for each one of the mobile computing devices 118, system 100 uses the same buffer 126 to generate and transmit copies of the discrete audio data packet with the respective headers. For each transmitted copy of a respective discrete audio data packet, the respective header is rebuilt, changing the IP address and control information based on which one of the mobile computing devices 118 is the destination device.

As each successive one of the discrete audio data packets 124 is placed in the buffer 126, the previous discrete audio data packet, along with all associated copies and headers, is overwritten. For example, when discrete audio data packet 124-2 arrives in the buffer 126, the discrete audio data packet 124-1, any copies 124-1C and associated headers in the buffer 126 are overwritten by discrete audio data packet 124-2. In order to avoid overwriting the previous discrete audio data packet before all of the copies of that discrete audio data packet and associated headers are transmitted to the mobile computing devices 118, according to some embodiments, the retrieval and transmission of the copies with the associated headers may be below the system latency time of the system 100 discussed above. According to some embodiments, system 100 reduces, and may eliminate, the per-client device memory overhead, results in low CPU load, low latency and scales easily to support a large number of connected clients.

Figure 6:
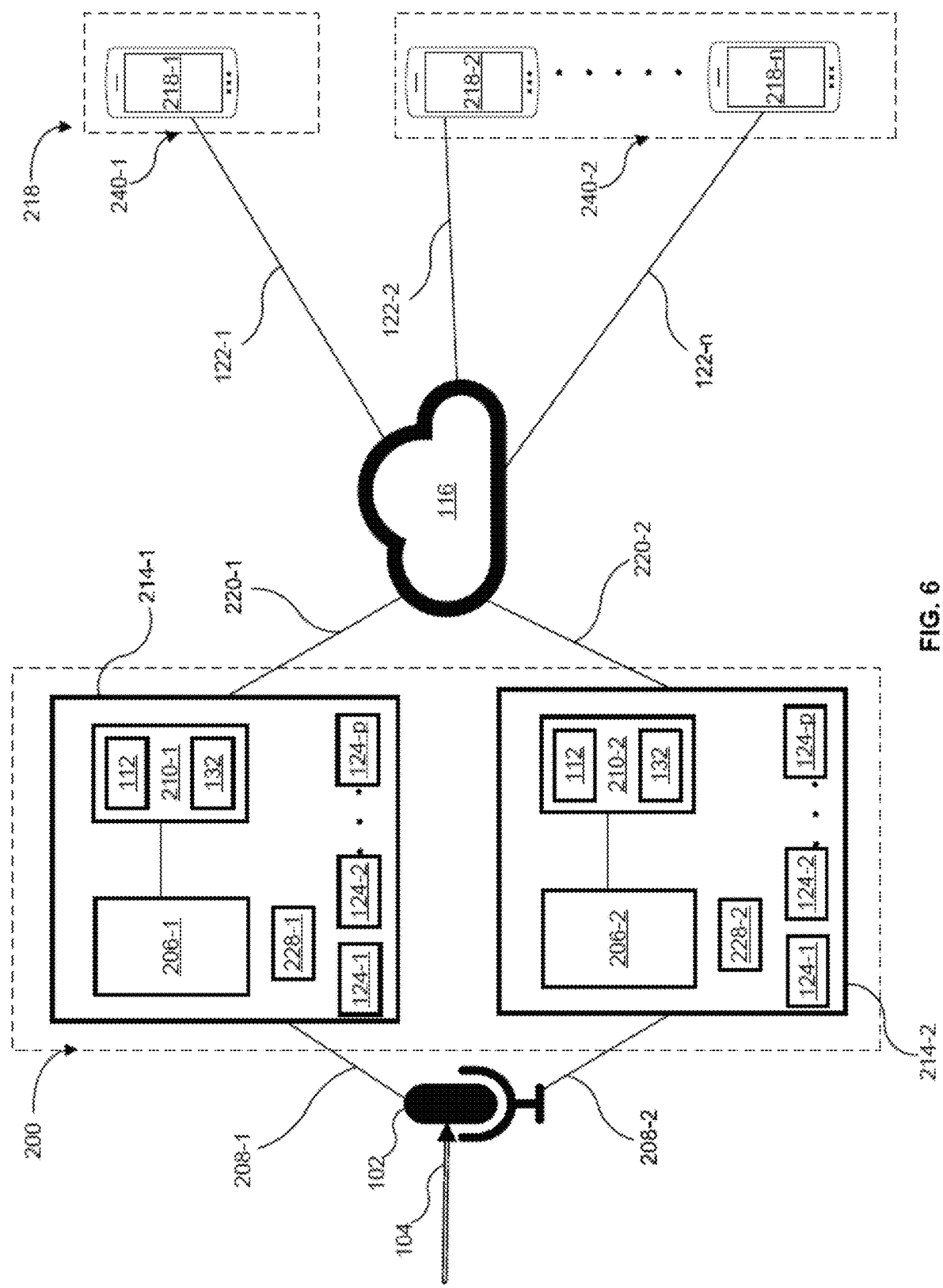
FIG. 6 depicts another example system for capturing and distributing a live audio stream of a live event in real-time to a plurality of mobile computing devices, according to non-limiting embodiments.

Attention is directed to FIG. 6, which depicts another example system 200 for capturing and distributing the live audio stream 104 of the live event in real-time to a plurality of mobile computing devices 218, and in which like or similar elements are denoted by like or similar numbers shown in FIG. 3. For simplicity and ease of understanding, discussion of the systems and devices depicted in FIG. 6 will focus on certain similarities and differences from those depicted in FIG. 3.

As shown in FIG. 6, example system 200 comprises a plurality of processing devices, such as processing devices 206-1 and 206-2. For simplicity, only two processing devices are depicted. However, according to some embodiments, the example system 200 comprises more than two processing devices. The processing device 206-1 is coupled to memory 210-1 and the processing device 206-2 is coupled to memory 210-2. In FIG. 6, processing device 206-1 and memory 210-1 are depicted as co-located on the same computing device 214-1, and processing device 206-2 and memory 210-2 are depicted as co-located on the same computing device 214-2. Similarly to example system 100, according to some embodiments, processing device 206-1 and memory 210-1 are not located on the same computing device. For example, system 200 may comprise two or more servers in wired and/or wireless communication with each other, and the processing device 206-1 may be located on one of the servers while memory 210-1 may be located on another one of the servers. Similar comments apply to processing device 206-2 and memory 210-2.

Both processing devices 206-1 and 206-2 (also referred to collectively as processing devices 206) are configured to communicate with audio input device 102 via communication links 208-1, 208-2 (referred to collectively as communication links 208). Data received by the audio input device 102 may be transmitted to the processing devices 206 via communication links 208 in accordance with UDP.

The processing device 206-1 is configured to transmit data over the first network 116, via communication link 220-1, for receipt by a first subset 240-1 of the mobile computing devices 218 (shown as including mobile computing device 218-1 in FIG. 6). The processing device 206-2 is configured to transmit data over the first network 116, via communication link 220-2, for receipt by a second, different subset 240-2 of the mobile computing devices 218 (shown as including mobile computing devices 218-2 to 218-n).

The processing devices 206 co-operate to service the mobile computing devices 218, as the number of mobile computing devices 218 increases. For example, multiple RTP processes may be utilized by the processing devices 206 such that processing device 206-1 utilizes RTSP transmission manager 228-1 and processing device 206-2 utilizes RTSP transmission manager 228-2. According to some embodiments, the processing devices 206 use the same RTSP manager to co-ordinate multiple RTP processes for multiple computing devices (e.g., multiple servers). Each one of the processing devices 206 transmits the copies of the discrete audio data packets in a manner similar to the processing device 106, except processing device 206-1 transmits the copies of the discrete audio data packets to the first subset 240-1 of the mobile computing devices 218 and the processing device 206-2 transmits the copies of the discrete audio data packets to the second subset 240-1 of the mobile computing devices 218.

The described systems may be scalable. For example, according to some embodiments, each of the processing devices 206 is enabled to service at least 250 mobile computing devices. For example, according to some embodiments, each of the processing devices 206 is enabled to service up to 500 mobile computing devices. According to some embodiments, each of the processing devices 206 is enabled to service at least 500 mobile computing devices. According to some embodiments, each of the processing devices 206 is enabled to service up to 1,000 mobile computing devices. For example, according to some embodiments, each of the processing devices 206 is enabled to service at least 1,000 mobile computing devices. According to some embodiments, each of the processing devices 206 is enabled to service up to 3,000 mobile computing devices. For example, according to some embodiments, each of the processing devices 206 is enabled to service at least 3,000 mobile computing devices.

According to some embodiments, the example system 200 is configured to add processing devices to service the mobile computing devices as more mobile computing devices are added and to assist with any load balancing between the processing devices.

Attention is directed to FIG. 7, which depicts a method 300 for capturing and distributing a live audio stream of a live event in real-time to a plurality of mobile computing devices. In order to assist in the explanation of method 300, it will be assumed that method 300 is performed using either example system 100 or example system 200, as indicated. Furthermore, the following discussion of method 300 will lead to a further understanding of example system 100 and example system 200, and the various components of those systems. However, it is to be understood that example system 100, example system 200 and/or method 300 can be varied, and need not work exactly as discussed herein in conjunction with each other, and that such variations are within the scope of present implementations.

It is appreciated that, in some aspects, method 300 is implemented by first example system 100 or example system 200 by processing device 106. Indeed, method 300 is one way in which example system 100 or example system 200 may be configured. It is to be emphasized, however, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of first entity computing system 100 and first computing system 200 as well.

At block 302, the live audio stream 104 is received, in real-time, by at least one audio input device, such as the audio input device 102. Upon receipt of the live audio stream 104, one or more processing devices, such as processing device 106 or processing devices 206, generate, in real-time, a plurality of discrete audio data packets 124 from the live audio stream 104 (block 304). As each discrete audio data packet is generated, the processing device(s) transmit that respective discrete audio data packet over a first network 116 for receipt by the plurality of mobile computing devices, such as mobile computing devices 118, 218 (block 306). In transmitting each respective discrete audio data packet, the processing device(s) transmits a copy of that respective discrete audio data packet, such as 124-1C, for receipt by each one of the mobile computing devices, such as mobile computing devices 118, 218, prior to transmitting another one of the discrete audio data packets to the mobile computing devices 118, 218. In other words, the processing device(s) receive the live audio stream 104, generate the discrete audio data packets and transmit the discrete audio data packets as they are being generated to the mobile computing devices in real-time.

A collection of exemplary examples, including at least some explicitly enumerated as "ECs" (Example Combinations), providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

EC 1. A system for capturing and distributing a live audio stream of a live event in real-time to a plurality of mobile computing devices, the system comprising at least one memory configured to store computer-executable instructions; and at least one processing device coupled to the at least one memory and at least one audio input device configured to receive the live audio stream, the computer-executable instructions when executed by the at least one processing device causing the at least one processing device to: upon receipt of the live audio stream at the at least one audio input device: generate, in real-time, a plurality of discrete audio data packets from the live audio stream; and as each discrete audio data packet is generated, transmit that respective discrete audio data packet over a first network for receipt by the plurality of mobile computing devices, wherein the transmitting comprises, for each one of the plurality of discrete audio data packets, the at least one processing device transmitting a copy of the discrete audio data packet for receipt by each one of the plurality of mobile computing devices prior to transmitting another one of the plurality of discrete audio data packets to any of the plurality of mobile computing devices.

EC 2. The system of any of the preceding or subsequent example combinations, wherein the computer-executable instructions when executed by the at least one processing device further cause the at least one processing device to: for each copy of the each discrete audio data packet; generate a header comprising a packet sequence number associated with the copy of the each discrete audio data packet and a unique identifier associated with a respective one of the plurality of mobile computing devices; and add the header with the copy of the each discrete audio data packet, prior to transmitting the copy of the each discrete audio data packet for receipt by its respective one of the plurality of mobile computing devices, wherein the respective one of the plurality of mobile computing devices is the particular mobile computing device of the plurality of mobile computing devices to which the copy of the each discrete audio data packet is transmitted for receipt.

EC 3. The system of any of the preceding or subsequent example combinations, wherein the computer-executable instructions when executed by the at least one processing device further cause the at least one processing device to: prior to transmitting a copy of the discrete audio data packet: place the each discrete audio data packet in a buffer; and generate the copy of the each discrete audio data packet for each one of the plurality of mobile devices, wherein the transmitting comprises the at least one processing device retrieving the copy of the each discrete audio data packet from the buffer, and the plurality of mobile devices have subscribed to the live audio stream.

EC 4. The system of any of the preceding or subsequent example combinations, wherein the buffer is configured to store a single one of the discrete audio data packets.

EC 5. The system of any of the preceding or subsequent example combinations, wherein the time from receiving of the live audio stream at the at least one audio input device to transmitting of each one of the plurality of discrete audio data packets to the plurality of mobile devices is in the range of: about near-zero milliseconds (mS) to about 25 mS, or about near-zero mS to about 100 mS, or about 100 mS to about 500 mS, or about 500 mS or less.

EC 6. The system of any of the preceding or subsequent example combinations, wherein the at least one processing device transmits that respective discrete audio data packet over the first network for receipt by the plurality of mobile computing devices by Unicast transmission.

EC 7. The system of any of the preceding or subsequent example combinations, wherein the at least one processing device transmits that respective discrete audio data packet over the first network for receipt by the plurality of mobile computing devices in accordance with the User Datagram Protocol (UDP).

EC 8. The system of any of the preceding or subsequent example combinations, wherein the at least one processing device comprises a plurality of processing devices, and the plurality of processing devices are enabled to retrieve and transmit the copy of the each discrete audio data packet from the buffer before the copy is over-written by a copy of a next discrete audio data packet generated from the live audio data stream is placed in the buffer, and wherein each one of the plurality of processing devices is enabled to provide Unicast transmission to a different subset of the plurality of mobile computing devices.

EC 9. A non-transitory computer-readable medium for capturing and distributing a live audio stream of a live event in real-time to a plurality of mobile computing devices, the computer-readable medium comprising computer-executable instructions for: receiving, in real-time, the live audio stream via at least one audio input device; via at least one processing device: upon receipt of the live audio stream at the at least one audio input device, generating, in real-time, a plurality of discrete audio data packets from the live audio stream; and as each discrete audio data packet is generated, transmitting that respective discrete audio data packet over a first network for receipt by the plurality of mobile computing devices, wherein the transmitting comprises, for each one of the plurality of discrete audio data packets, transmitting a copy of the discrete audio data packet for receipt by each one of the plurality of mobile computing devices prior to transmitting another one of the plurality of discrete audio data packets to any of the plurality of mobile computing devices.

EC 10. The non-transitory computer-readable medium of any of the preceding or subsequent example combinations, wherein the computer-readable medium further comprising computer-executable instructions for: for each copy of the each discrete audio data packet, generating a header comprising a packet sequence number associated with the copy of the each discrete audio data packet and a unique identifier associated with a respective one of the plurality of mobile computing devices; and adding the header with the copy of the each discrete audio data packet, prior to transmitting the copy of the each discrete audio data packet for receipt by its respective one of the plurality of mobile computing devices, wherein the respective one of the plurality of mobile computing devices is the particular mobile computing device of the plurality of mobile computing devices to which the copy of the each discrete audio data packet is transmitted for receipt.

EC 11. The non-transitory computer-readable medium of any of the preceding or subsequent example combinations, wherein the computer-readable medium further comprising computer-executable instructions for: prior to transmitting a copy of the discrete audio data packet, placing the each discrete audio data packet in a buffer, and generating the copy of the each discrete audio data packet for each one of the plurality of mobile devices; and wherein the transmitting comprises retrieving the copy of the each discrete audio data packet from the buffer, and the plurality of mobile devices have subscribed to the live audio stream.

EC 12. The non-transitory computer-readable medium of any of the preceding or subsequent example combinations, wherein the buffer is configured to store a single one of the discrete audio data packets.

EC 13. A method for capturing and distributing a live audio stream of a live event in real-time to a plurality of mobile computing devices, the method comprising: receiving, in real-time, the live audio stream via at least one audio input device; via at least one processing device: upon receipt of the live audio stream at the at least one audio input device; generating, in real-time, a plurality of discrete audio data packets from the live audio stream; and as each discrete audio data packet is generated, transmitting that respective discrete audio data packet over a first network for receipt by the plurality of mobile computing devices, wherein the transmitting comprises, for each one of the plurality of discrete audio data packets, transmitting a copy of the discrete audio data packet for receipt by each one of the plurality of mobile computing devices prior to transmitting another one of the plurality of discrete audio data packets to any of the plurality of mobile computing devices.

EC 14. The method of any of the preceding or subsequent example combinations, wherein the transmitting further comprises: for each copy of the each discrete audio data packet, generating a header comprising a packet sequence number associated with the copy of the each discrete audio data packet and a unique identifier associated with a respective one of the plurality of mobile computing devices; and adding the header with the copy of the each discrete audio data packet, prior to transmitting the copy of the each discrete audio data packet for receipt by its respective one of the plurality of mobile computing devices, wherein the respective one of the plurality of mobile computing devices is the particular mobile computing device of the plurality of mobile computing devices to which the copy of the each discrete audio data packet is transmitted for receipt.

EC 15. The method of any of the preceding or subsequent example combinations, further comprising: prior to transmitting a copy of the discrete audio data packet, placing the each discrete audio data packet in a buffer, and generating the copy of the each discrete audio data packet for each one of the plurality of mobile devices; and wherein the transmitting comprises retrieving the copy of the each discrete audio data packet from the buffer, and the plurality of mobile devices have subscribed to the live audio stream.

EC 16. The method of any of the preceding or subsequent example combinations, wherein the buffer is configured to store a single one of the discrete audio data packets.

EC 17. The method of any of the preceding or subsequent example combinations, wherein the time from receiving of the live audio stream at the at least one audio input device to transmitting of each one of the plurality of discrete audio data packets to the plurality of mobile devices is in the range of: about near-zero mS to about 25 mS, or about near-zero mS to about 100 mS, or about 100 mS to about 500 mS, or about 500 mS or less.

EC 18. The method of any of the preceding or subsequent example combinations, wherein the transmitting is by Unicast transmission.

EC 19. The method of any of the preceding or subsequent example combinations, wherein the transmitting is in accordance with the UDP.

EC 20. The method of any of the preceding or subsequent example combinations, wherein the at least one processing device comprises a plurality of processing devices, and the plurality of processing devices retrieve and transmit the copy of the each discrete audio data packet from the buffer before the copy is over-written by a copy of a next discrete audio data packet generated from the live audio data stream is placed in the buffer, and wherein each one of the plurality of processing devices provides Unicast transmission to a different subset of the plurality of mobile computing devices.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system for capturing and distributing a live audio stream of a live event in real-time to a plurality of mobile computing devices, the system comprising:
 at least one memory configured to store computer-executable instructions; and at least one processing device coupled to the at least one memory and at least one audio input device configured to receive the live audio stream, the computer-executable instructions when executed by the at least one processing device causing the at least one processing device to:
 upon receipt of the live audio stream at the at least one audio input device:
 generate, in real-time, a plurality of discrete audio data packets from the live audio stream;
 prior to transmitting copies of the plurality of discrete audio data packets:
 place each discrete audio data packet of the plurality of discrete audio packets in a buffer: and generate a copy of each discrete audio data packet for each one of the plurality of mobile computing devices: and
 as each discrete audio data packet is generated, retrieve the copy of each discrete audio data packet from the buffer and transmit that respective copy of the discrete audio data packet over a first network for receipt by the plurality of mobile computing devices, wherein the plurality of mobile computing devices having subscribed to the live audio stream, wherein the at least one processing device is enabled to retrieve and transmit the copy of the each discrete audio data packet from the buffer before the copy is over written by a copy of a next discrete audio data packet generated from the live audio data stream is placed the buffer, and wherein the transmitting comprises:
 transmitting, by Unicast transmission, a single copy of a first discrete audio data packet of the plurality of discrete audio data packets for receipt by each one of the plurality of mobile computing devices without transmitting other copies of the first discrete audio data packet to the plurality of mobile computing devices; and
 after transmitting the single copy of the first discrete audio data packet, transmitting, by Unicast transmission, a single copy of a second discrete audio data packet of the plurality of discrete audio data packets different from the first discrete audio data packet, for receipt by each one of the plurality of the mobile computing devices without transmitting other copies of the second discrete audio data packet to the plurality of mobile computing devices.

2. The system of claim 1, wherein the computer-executable instructions when executed by the at least one processing device further cause the at least one processing device to:
 for each copy of the each discrete audio data packet:
 generate a header comprising a packet sequence number associated with the copy of the each discrete audio data packet and a unique identifier associated with a respective one of the plurality' of mobile computing devices; and
 add the header with the copy of the each discrete audio data packet, prior to transmitting the copy of the each discrete audio data packet for receipt by its respective one of the plurality of mobile computing devices,
 wherein the respective one of the plurality of mobile computing devices is a particular mobile computing device of the plurality of mobile computing devices to which the copy of the each discrete audio data packet is transmitted for receipt.

3. The system of claim 1, wherein the buffer is configured to store a single one of the discrete audio data packets.

4. The system of claim 1, wherein the time from receiving of the live audio stream at the at least one audio input device to transmitting of each one of the plurality of discrete audio data packets to the plurality' of mobile computing devices is n the range of: about near-zero milliseconds (mS) to about 25 mS, or about near-zero mS to about 100 mS, or about 100 mS to about 500 mS, or about 500 mS or less.

5. The system of claim 1, wherein the at least one processing device transmits that respective discrete audio data packet over the first network for receipt by the plurality of mobile computing devices in accordance with the User Datagram Protocol (UDP).

6. The system of claim 1 wherein the at least one processing device comprises a plurality of processing devices, and and wherein each one of the plurality of processing devices is enabled to provide Unicast transmission to a different subset of the plurality of mobile computing devices.

7. A non-transitory computer-readable medium for capturing and distributing a live audio stream of a live event in real-time to a plurality of mobile computing devices, the computer-readable medium comprising computer-executable instructions for:
receiving, in real-time, the live audio stream via at least one audio input device; via at least one processing device:
upon receipt of the live audio stream at the at least one audio input device,
generating, in real-time, a plurality of discrete audio data packets from the live audio stream;
prior to transmitting copies of the plurality of discrete audio data packets:
place each discrete audio data packet of the plurality of discrete audio packets in a buffer: and generate a copy of each discrete audio data packet for each one of the plurality of mobile computing devices: and
as each discrete audio data packet is generated, retrieving the copy of each discrete audio data packet from the buffer and transmitting that respective copy of the discrete audio data packet over a first network for receipt by the plurality of mobile computing devices, wherein the plurality of mobile computing devices having subscribed to the live audio stream, wherein the at least one processing device is enabled to retrieve and transmit the copy of the each discrete audio data packet from the buffer before the copy is over-written by a copy of a next discrete audio data packet generated from the live audio data stream is placed in the buffer, and wherein the transmitting comprises;
transmitting, by Unicast transmission, a single copy of a first discrete audio data packet of the plurality of discrete audio data packets for receipt by each one of the plurality of mobile computing devices without transmitting other copies of the first discrete audio data packet to the plurality of mobile computing devices; and
after transmitting the single copy of the first discrete audio data packet, transmitting, by Unicast transmission, a single copy of a second discrete audio data packet of the plurality of discrete audio data packets different from the first discrete audio data packet, for receipt by each one of the plurality of the mobile computing devices without transmitting other copies of the second discrete audio data packet to the plurality of mobile computing devices.

8. The non-transitory computer-readable medium of claim 7, wherein the computer-readable medium further comprising computer-executable instructions for: for each copy of the each discrete audio data packet,
generating a header comprising a packet sequence number associated with the copy of the each discrete audio data packet and a unique identifier associated with a respective one of the plurality of mobile computing devices; and
adding the header with the copy of the each discrete audio data packet prior to transmitting the copy of the each discrete audio data packet for receipt by its respective one of the plurality of mobile computing devices,
wherein the respective one of the plurality of mobile computing devices is a particular mobile computing device of the plurality of mobile computing devices to winch the copy of the each discrete audio data packet is transmitted for receipt.

9. The non-transitory computer-readable medium of claim 7, wherein the buffer is configured to store a single one of the discrete audio data packets.

10. A method for capturing and distributing a live audio stream of a live event in real-time to a plurality of mobile computing devices, the method comprising:
receiving, in real-time, the live audio stream via at least one audio input device; via at least one processing device:
upon receipt of the live audio stream at the at least one audio input device; generating, in real-time, a plurality of discrete audio data packets from the live audio stream;
prior to transmitting conies of the plurality of discrete audio data packets:
place each discrete audio data packet of the plurality of discrete audio packets in a buffer: and generate a copy of each discrete audio data packet for each one of the plurality of mobile computing devices: and
as each discrete audio data packet is generated, retrieving the copy of each discrete audio data packet from the buffer and transmitting that respective copy of the discrete audio data packet over a first network for receipt by the plurality of mobile computing devices, wherein the plurality of mobile computing devices having subscribed to the live audio stream, wherein the at least one processing device is enabled to retrieve and transmit the copy of the each discrete audio data packet from the buffer before the copy is over-written by a copy of a next discrete audio data packet generated from the live audio data stream is placed in the buffer, and wherein the transmitting comprises;
transmitting, by Unicast 'transmission, a single copy of a first discrete audio data packet of the plurality of discrete audio data packets for receipt by each one of the plurality of mobile computing devices without transmitting other copies of the first discrete audio data packet to the plurality of mobile computing devices; and
after transmitting the single copy of the first discrete audio data packet, transmitting, by Unicast transmission, a single copy of a second discrete audio data packet of the plurality of discrete audio data packets different from the first discrete audio data packet, for receipt by each one of the plurality of the mobile computing devices without transmitting other copies of the second discrete audio data packet to the plurality of mobile computing devices.

11. The method of claim 10, wherein the transmitting further comprises:

for each copy of the each discrete audio data packet, generating a header comprising a packet sequence number associated with the copy of the each discrete audio data packet and a unique identifier associated with a respective one of the plurality of mobile computing devices; and adding the header with the copy of the each discrete audio data packet, prior to transmitting the copy of the each discrete audio data packet for receipt by its respective one of the plurality of mobile computing devices, wherein the respective one of the plurality of mobile computing devices is a particular mobile computing device of file plurality of mobile computing devices to which the copy of the each discrete audio data packet is transmitted for receipt.

12. The method of claim 10 wherein the buffer is configured to store a single one of the discrete audio data packets.

13. The method of claim 10, wherein the time from receiving of the live audio stream at the at least one audio input device to transmitting of each one of the plurality of discrete audio data packets to the plurality of mobile computing devices is in the range of: about near-zero mS to about 25 mS, or about near-zero mS to about 100 mS, or about 100 mS to about 500 mS, or about 500 mS or less.

14. The method of claim 10, wherein the transmitting is in accordance with the UDP.

15. The method of claim 10 wherein the at least one processing device comprises a plurality of processing devices and wherein each one of the plurality of processing devices is enabled to provide Unicast transmission to a different subset of the plurality of mobile computing devices.

\* \* \* \* \*